United States Patent [19]

Yamaguchi

[11] Patent Number: 5,039,899
[45] Date of Patent: Aug. 13, 1991

[54] PIEZOELECTRIC TRANSDUCER
[75] Inventor: Masaki Yamaguchi, Gifu, Japan
[73] Assignee: Brother Kogyo Kabushiki Kaisha, Aichi, Japan
[21] Appl. No.: 485,517
[22] Filed: Feb. 27, 1990
[30] Foreign Application Priority Data Feb. 28, 1989 [JP] Japan ................................. 1-46865
Mar. 27, 1989 [JP] Japan ................................. 1-74160

[51] Int. Cl.⁵ .......................................... H01L 41/08
[52] U.S. Cl. ..................................... 310/323; 310/328
[58] Field of Search ................................. 310/323, 328

[56] References Cited

U.S. PATENT DOCUMENTS

| 4,195,243 | 3/1980 | Thaxter | 310/328 |
| 4,491,759 | 1/1985 | Kunz et al. | 310/323 |
| 4,513,219 | 4/1985 | Katsuma et al. | 310/328 |
| 4,736,129 | 4/1988 | Endo et al. | 310/323 |
| 4,763,148 | 8/1988 | Tsukimoto et al. | 310/323 |
| 4,779,018 | 10/1988 | Okuno et al. | 310/323 |
| 4,788,468 | 11/1988 | Izukawa et al. | 310/323 |
| 4,857,793 | 8/1989 | Okuno | 310/323 |

FOREIGN PATENT DOCUMENTS

| 60-22478 | 2/1985 | Japan | 310/323 |
| 63-11073 | 1/1988 | Japan | 310/323 |
| 0294278 | 11/1988 | Japan | 310/323 |
| 0294281 | 11/1988 | Japan | 310/323 |
| 2079101 | 1/1982 | United Kingdom | 310/323 |

Primary Examiner—Mark O. Budd
Assistant Examiner—Thomas M. Dougherty
Attorney, Agent, or Firm—Oliff & Berridge

[57] ABSTRACT

This invention relates to a piezoelectric transducer comprising an elastic member resonating with substantially the same frequency in a first and a second directions intersecting therewith, a first exciter exciting the vibration of substantially the same frequency in both directions of the elastic member, and a second exciter exciting the vibration of the above frequency in the first direction of the elastic member and exciting the vibration of substantially the same frequency and of the negative phase in the second direction.

Also, the other transducer comprising an electromechanical conversion element which generates ultrasonic vibration by applying AC electric signal, an elastic member where at least 2-way substantially orthogonal vibration is excited by the vibration of the electromechanical conversion element and a holding member made of or constructed as to have a different directional elastic characteristic at a node of either one at least directional vibration which the rigidity of the intersecting direction is set smaller than the rigidity of the vibrational direction having the node.

10 Claims, 7 Drawing Sheets

PIEZOELECTRIC TRANSDUCER

BACKGROUND OF THE INVENTION

The invention relates to an electromechanical transducer having a substantially elliptical vibration. The above transducer is utilized mainly in an ultrasonic motor of a standing-wave type. Its operational principle is to drive a rotor with the substantially elliptical movement of a transducer. Such motors move the mover by applying frictional force between each mass point of the mover and the transducer, which is held against the mover with preset pressure. The standing-wave type piezoelectric transducer is easily constituted to realize highly efficient vibration. Compared with a traveling-wave type motor, the standing-wave type motor has an advantage of high efficiency and high output.

The piezoelectric transducer utilized in a conventional standing-wave type motor is a mechanical resonance type. In order to excite an elliptical movement with high efficiency, it uses mechanical resonance having a normal vibration mode making a one-way vibration on the contact surface of an elastic member with an exciter, and making an elliptical vibration on the contact surface of the elastic member with the mover. Such a piezoelectric transducer presents two main problems.

First, it is difficult to excite a one-way vibration with same frequency on the elastic member which vibrates in two directions without exciting the other directional vibration due to slight constructional asymmetry between the elastic member and the exciter. Therefore, the transducer of high efficiency and large output has not been obtained. Also in order to excite a single vibration on the elastic member, the constitution of the transducer was largely restricted.

In addition, the piezoelectric transducer utilized in the standing-wave type ultrasonic motor simultaneously excites a two-directional vibration substantially intersecting a resonator fixed on an electromechanical conversion element to obtain a substantially elliptical vibration. Conventionally, the transducer is fixed by supporting at the position of matching nodes of the two-directional vibration.

However, a second problem with the prior art is that the shape of the resonance is largely restricted to match the nodes of the two-directional vibration. The combination of vibration modes is also restricted.

SUMMARY OF THE INVENTION

Firstly, the present invention has been made to solve the above first problem. The object is to provide a piezoelectric transducer with high efficiency and large output by not exciting unnecessary vibration on the elastic member.

In order to attain the above object, the piezoelectric transducer of this invention comprises;

an elastic body having a resonance frequency in a first direction and a resonance frequency in a second direction orthogonal to the first direction, where the resonance frequencies are substantially equal to an excitation frequency;

first and second vibration elements attached to the elastic body; and excitation means for causing the first and second vibrator elements to vibrate at the excitation frequency, where the magnitude of the vibration of the elastic body in the first and second directions is determined by the phase difference between the vibration of the first and second vibration elements.

BRIEF DESCRIPTION OF DRAWINGS

FIG. 1 is a side view of a transducer. FIG. 2 is a break-down perspective view of the transducer. FIG. 3 is a diagram showing the relation between exciting positions and amplitudes. FIG. 4 is a break-down perspective view of the transducer in other modification. FIG. 5 is a side view of a linear ultrasonic motor utilizing the transducer.

FIG. 6 is a perspective view of the transducer. FIG. 7 is an explanation of the vibration mode of the transducer. FIG. 8 is a side view of a linear ultrasonic motor of the second embodiment.

DETAILED DESCRIPTION OF PREFERRED EMBODIMENTS

Figure 1:
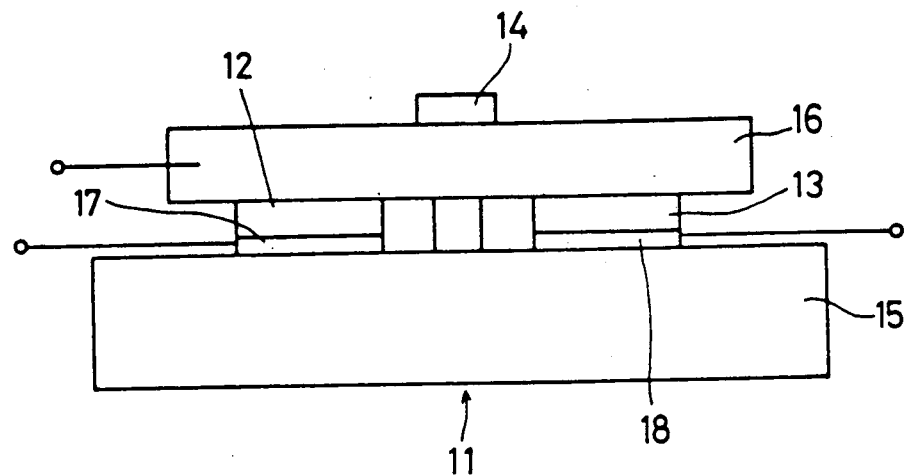
FIGS. 1 through 5 show a first embodiment.
Figure 2:
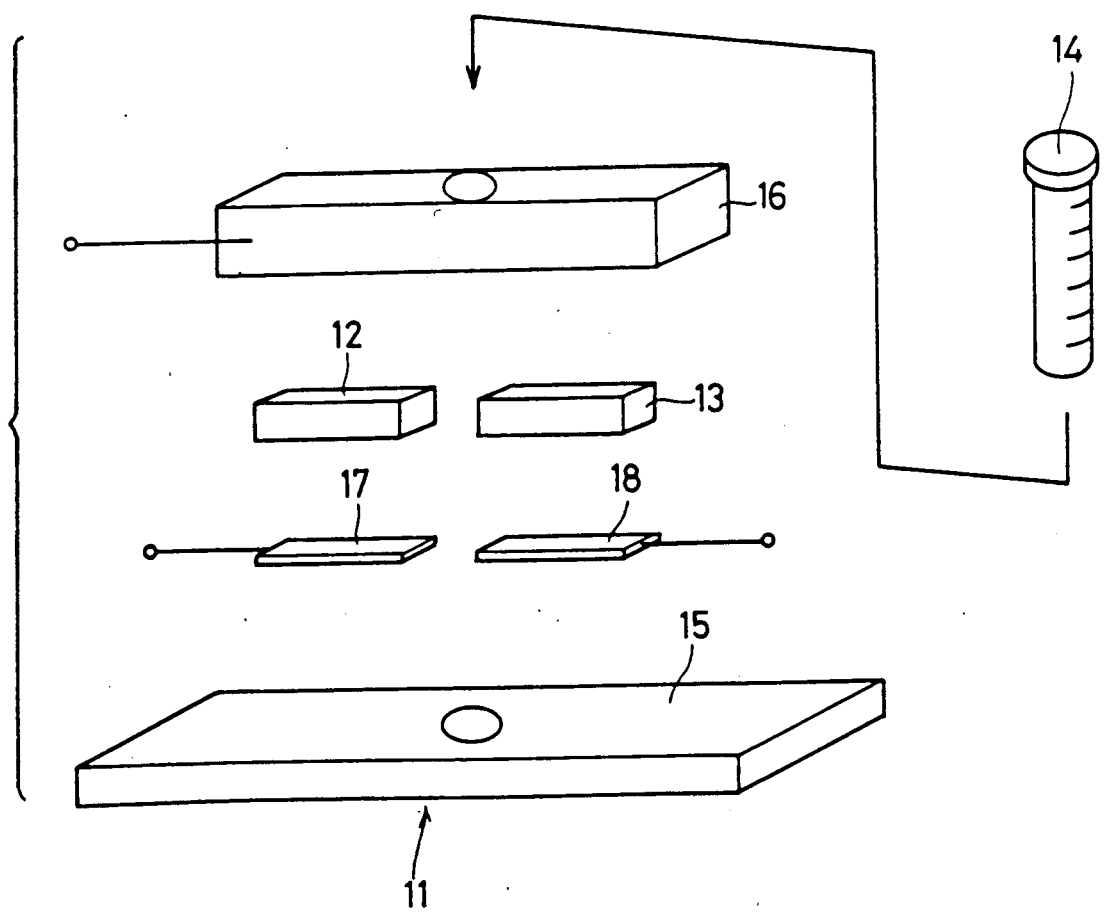
Figure 3A:
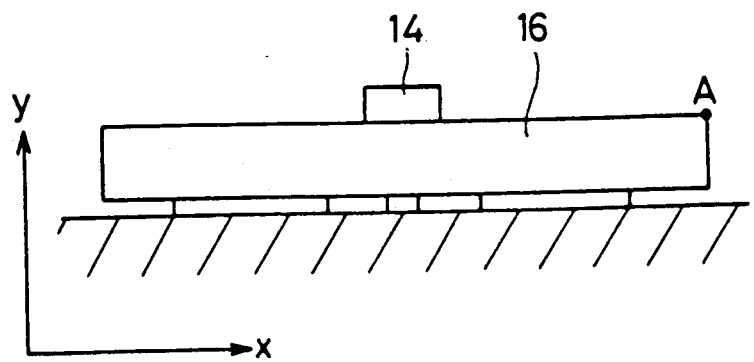
Figure 3B:
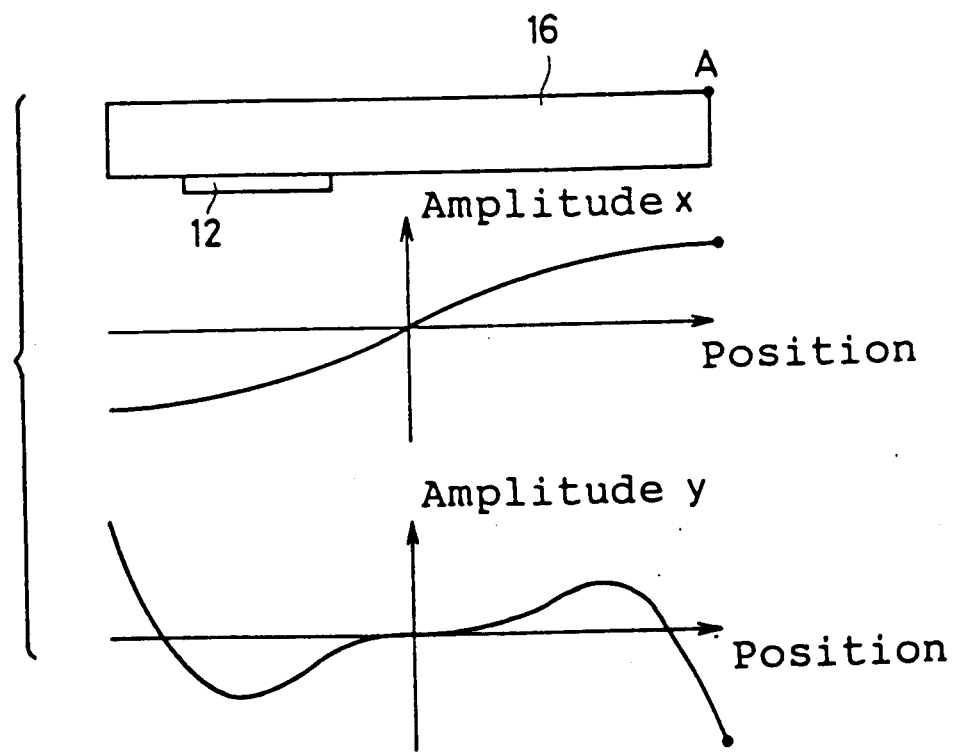
Figure 3C:
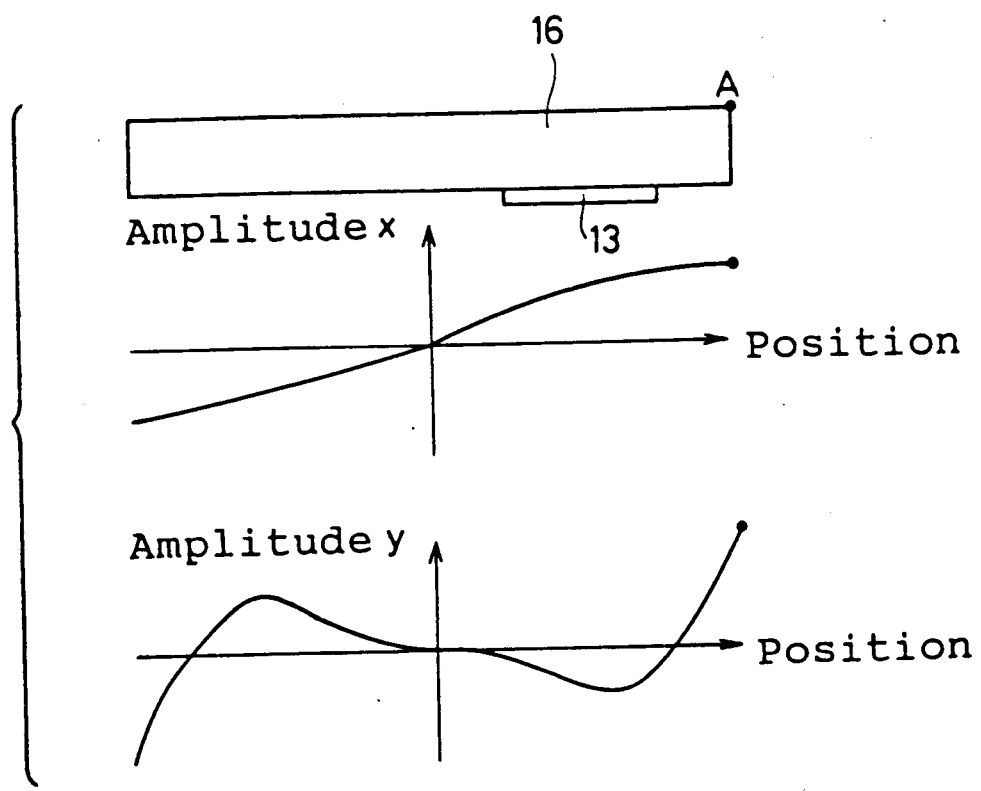
Figure 4:
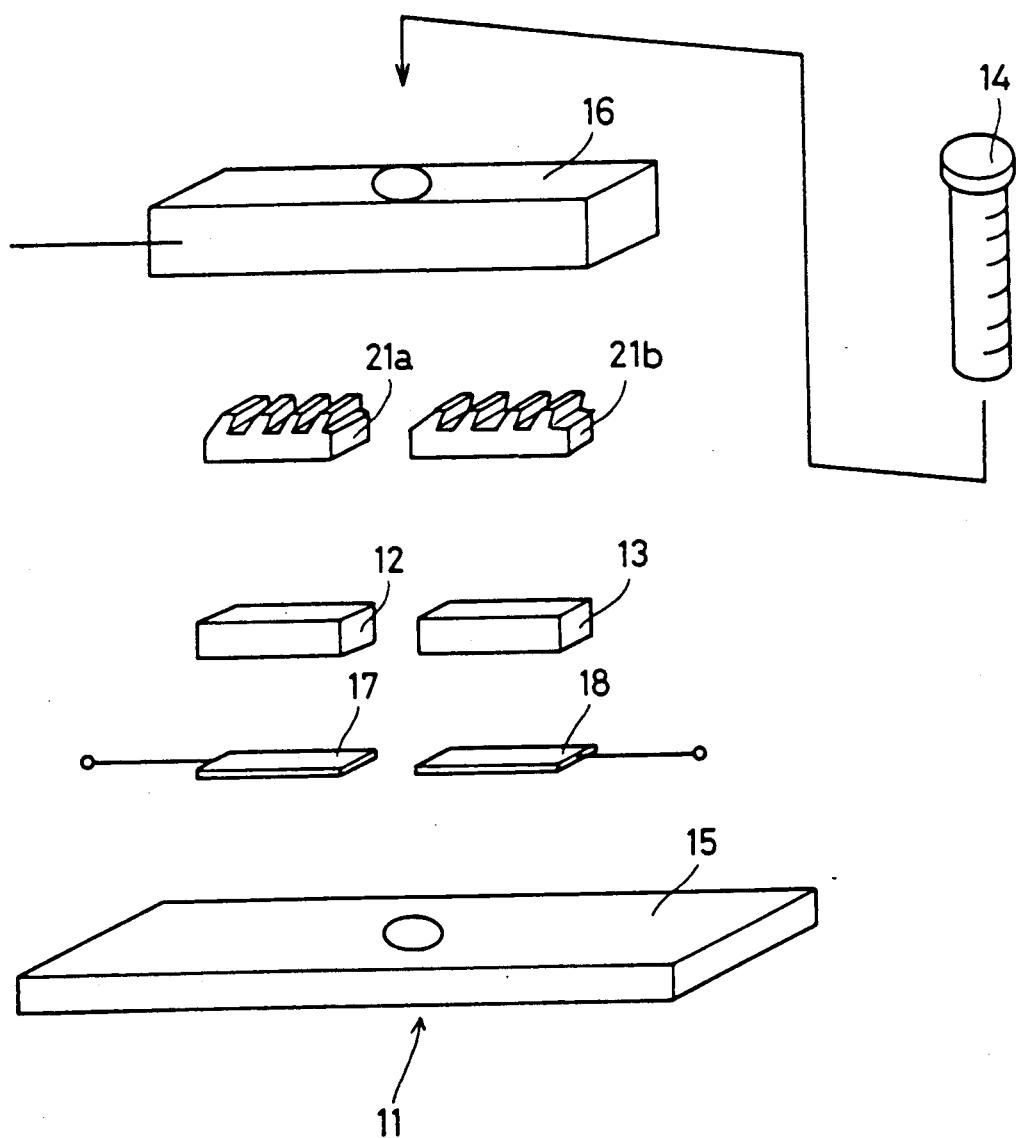

FIGS. 1 to 3 show a piezoelectric transducer of a first embodiment. A transducer 11 comprises a first piezoelectric body 12 and a second piezoelectric body 13 symmetrically fixed on a base 15, with a bolt 14 at the center. The first piezoelectric body 12 and the second piezoelectric body 13 are polarized in a vertical direction in FIG. 1 and vibrate in a thickness direction. On the surfaces of the first piezoelectric body 12 and the second piezoelectric body 13, a planar elastic member 16 is fixed to the base 15 with the bolt 14.

On under surfaces of the first piezoelectric body 12 and the second piezoelectric body 13, electrodes 17 and 18 are provided. The planar elastic member 16 serves as electrodes of the piezoelectric body 12 and 13.

The planar elastic member 16 makes a flexural vibration with specified frequency f in its thickness direction. Also it vibrates in the longitudinal direction with substantially the same frequency f.

The resonance frequency of the longitudinal vibration which propagates through the planar elastic member generally depends on the length of the planar elastic member. The resonance frequency of the flexural vibration of the planar elastic member in the thickness direction depends on the above length and the thickness. Accordingly, the design of such a planar elastic member 16 as described above is well-known in the art.

Its operation will now be explained with reference to FIG. 3. First, when the AC voltage of the frequency f causes first piezoelectric body 12 to vibrate, the planar elastic member 16 resonates in the vertical vibration primary mode and a point A in the Figure stretches in the +x direction. Simultaneously, the planar elastic member 16 also resonates in the flexural vibration secondary mode and the point A moves in the +y direction.

Next, when the voltage of the same phase as the AC voltage applied on the first piezoelectric body 12 is applied with the frequency f on the second piezoelectric body 13 to vibrate, the above planar elastic member 16 resonates in the vertical vibration primary mode and the point A stretches in the +x direction. Also in the flexural vibration secondary mode, the elastic member 16 resonates and the point A moves in the −y direction.

In other words, when the first and the second piezoelectric bodies 12 and 13 are simultaneously vibrated, if the voltage applied on both bodies is of the same phase, the above-described flexural vibration is offset and the planar elastic member 16 does not vibrate in the y direction. If the voltage applied is of the negative phase, the above-described vertical vibration is offset and the amplitude in the x direction doesn't appear.

By adjusting the phase of the voltages applied on the two piezoelectric bodies 12 and 13, it is possible to generate a substantially elliptical movement of desired shape at the end portion A of the planar elastic member 16.

In order to convey effectively the vibration generated by the two piezoelectric bodies 12 and 13 to the planar elastic member 16, connectors 21a and 21b with a plurality of inclined pieces formed can be inserted between the piezoelectric bodies 12 and 13 and the planar elastic member 16. The thickness vibration generated by the piezoelectric bodies 12 and 13 is changed by the connectors in its direction, thus the vertical vibration being effectively generated on the planar elastic member 16.

Figure 5:
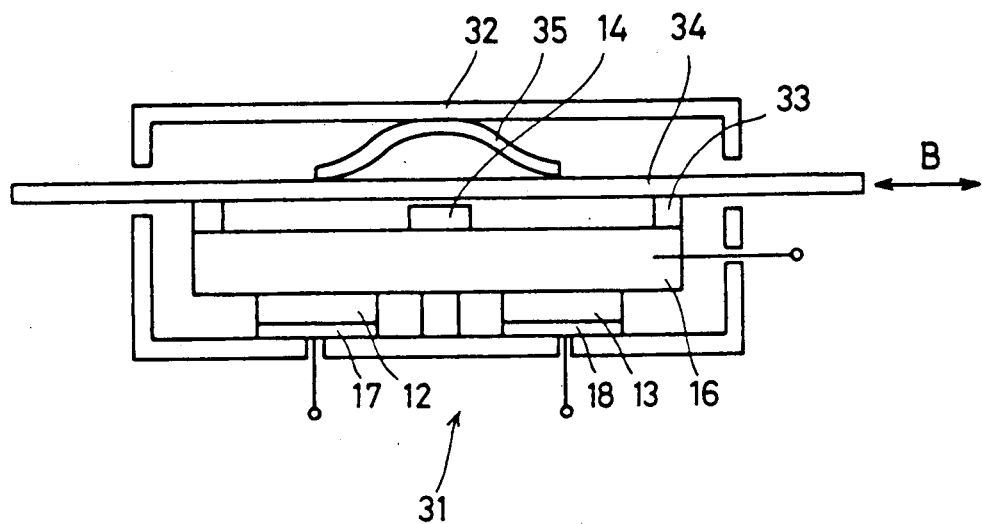

Next, a linear ultrasonic motor utilizing the above-mentioned piezoelectric transducer 11 will now be explained with reference to FIG. 5. In the motor 31, the transducer 11 is fixed on a yoke 32 and an output portion 33 is formed at one end of the planar elastic member 16 of the transducer 11. On the output portion 33, a mover 34 is pressed via leaf spring 35, one end of which is fixed to the yoke 32. When the transducer 11 is excited, the mover 34 is driven by elliptical vibration of the elastic member 16 to move in the direction shown by an arrow mark B. The drive force is generated by the frictional force between the elastic member 16 and the mover 34.

The second embodiment will now be explained with reference to drawings FIG. 6 through FIG. 8.

Figure 6:
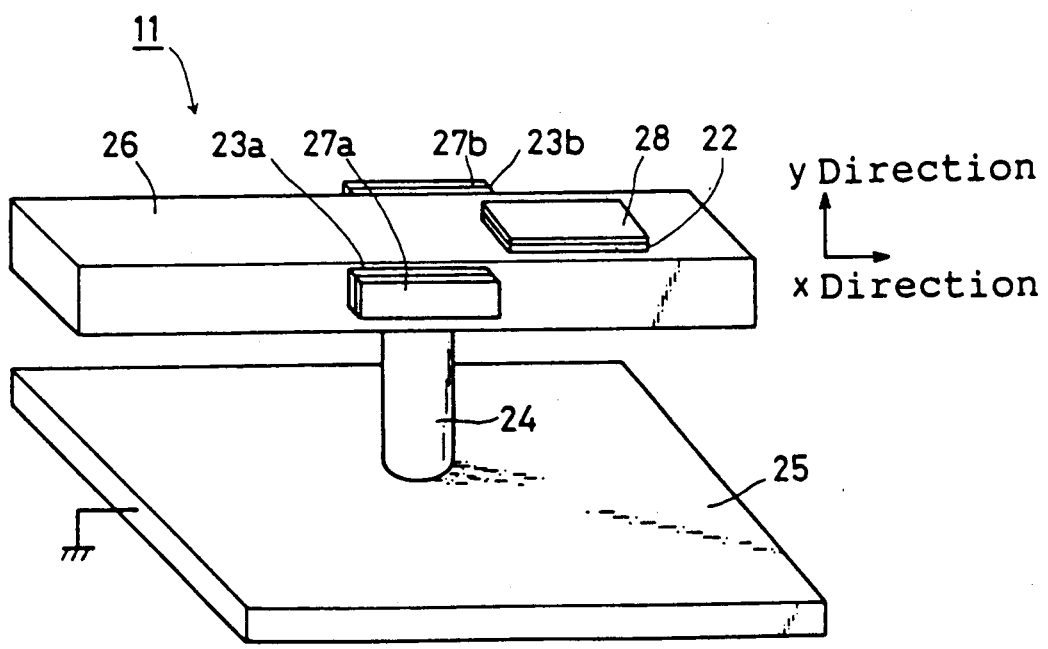
FIGS. 6 through 8 show a second embodiment.
Figure 7A:
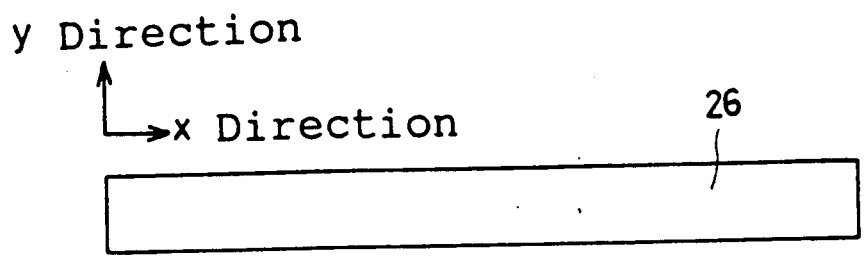
Figure 7B:
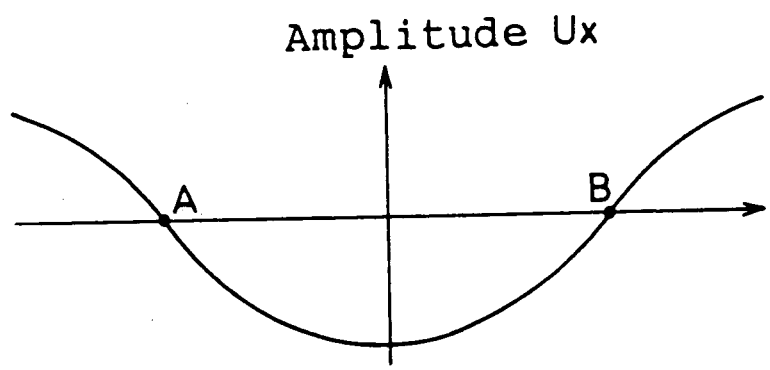
Figure 7C:
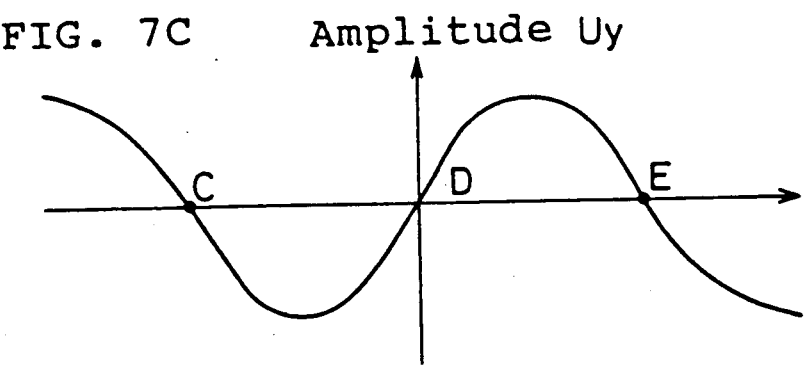

In a piezoelectric transducer 11, a first piezoelectric body 22 is fixed on the surface of a planar elastic member 26 to excite a flexural vibration in the y direction as shown in FIG. 6. On the side surfaces of the elastic member 26 substantially intersecting the above front surface, second piezoelectric bodies 23a and body 23b are fixed.

At the center of the elastic member in the longitudinal direction, a beam 24 is fixed in order to support the elastic member 26, the other end of which is fixed to a base 25.

On the upper surface of the first piezoelectric body 22, a positive electrode 28 is provided. Also on the surfaces of the second piezoelectric bodies 23a and 23b, positive electrodes 27a and 27b are provided. The other ends of the piezoelectric bodies 22 and 23 are grounded to the base 25.

The vibration mode of the elastic member 26 is explained with reference to FIG. 7. The shape and dimensions of the elastic member 26 are adjusted so as to make a longitudinal vibration at both free ends in the secondary mode at the specified frequency f in the x direction. The nodes in this case are A and B. Also, the shape and dimensions of the elastic member 26 are adjusted so as to make a flexural vibration at both free ends in the secondary mode at the same frequency f in the y direction. The nodes in this case are C, D, and E.

Further, the shape and dimensions of the beam 24 are adjusted so as to excite only a flexural vibration at the same frequency f in the x direction. Accordingly, the rigidity of the beam 24 is much stronger at the frequency f in the y direction than in the x direction.

The beam 24 is fixed to the elastic member 26 at one of the nodal points of flexural vibration. By adjusting the amplitude and phase of the voltage applied on the first piezoelectric body 22 and the second piezoelectric bodies 23a and 23b, it is possible to generate desired shape of substantially elliptical vibration on the elastic member 26. As the rigidity of the beam in the x direction is small, the vertical vibration is large, and the flexural vibration is not interfered with. As the rigidity in the y direction is large, the flexural vibration is effectively excited. In other words, the piezoelectric transducer 11 can be fixed without any restriction by the shape of the elastic member 26.

In this embodiment, the example is in the vertical vibration secondary mode and flexural vibration secondary mode but as far as the resonance frequency of the 2-way vibration can be matched, it is possible to use shear vibration, flexural vibration or a lower-order or higher-order mode.

Figure 8:
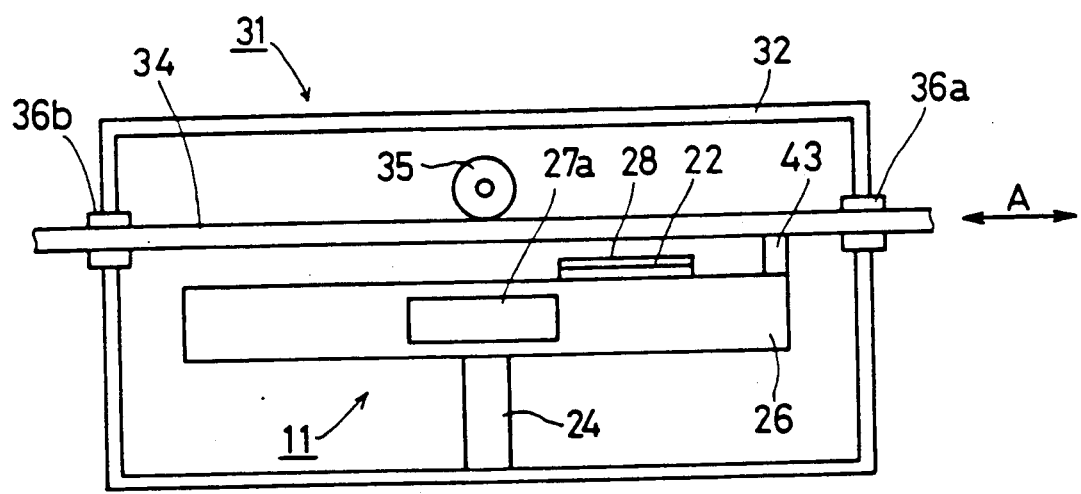

A linear ultrasonic motor utilizing this transducer 11 is constructed as shown in FIG. 8. In a motor 31, the piezoelectric transducer 11 is fixed to a yoke 32, and a drive portion 43 is formed at one end of the elastic member 26, where a mover 34 is pressed by a rubber roller 45. The mover 34 is supported by linear bearings 36a and 36b fixed to the yoke 32. When the transducer 11 is excited, the mover 34 is driven by the elliptical vibration of the elastic member 26, moving in the direction shown by an arrow mark A. This driving force is generated by the frictional force of the elastic member 26 with the mover 34.

In the above two embodiments, piezoelectric bodies are used as driving elements of the transducer. However, it is not limited to this but other elements which can convert electric energy to mechanical energy such as electrostrictive elements or magnetostrictive elements may be used. Moreover, in the embodiments, planar transducers are used. However, it is not limited to this but disks, cylindrical ones or others may be used. As far as it is not deviated from the spirit and scope of this invention, various modifications may be used.

What is claimed is:

1. An electromechanical transducer comprising:
   an elastic body having a resonance frequency in a first direction and a resonance frequency in a second direction orthogonal to the first direction, where the resonance frequencies are substantially equal to an excitation frequency, the elastic body having at least one nodal point at which the elastic body does not move when the elastic body vibrates at a resonance frequency thereof;
   first and second vibration elements attached to the elastic body symmetrically on opposite sides of the nodal point;
   support means for supporting the elastic body at the nodal point;
   excitation means for causing the first and second vibration elements to vibrate at the excitation frequency, where the magnitude of the vibration of the elastic body in the first and second directions is determined by the phase difference between the vibration of the first and second vibration elements; and
   two connecting members, each having a base and a plurality of transfer members attached to the base and inclines in the first direction, where the base of each connecting member is attached to one of the vibration elements and the transfer members contact the elastic body.

2. The electromechanical transducer of claim 1, wherein the first and second vibration elements are provided on one surface of the elastic member along an axis in the first direction and the excitation means causes the first and second vibration elements to vibrate in phase to minimize the movement of the elastic member in the second direction.

3. The electromechanical transducer of claim 1, wherein the rigidity of the elastic body is higher in the second direction than the first direction.

4. The electromechanical transducer of claim 3, wherein:
the elastic body has two nodal points in the first direction and three nodal points in the second direction and the support means is attached to the elastic body at one of the nodal points in the second direction and additionally comprising
a third vibration element attached to the elastic body; wherein
the first and second vibration elements are attached to opposing side surfaces of the elastic body, and the third vibration element is attached to a surface of the elastic body orthogonal to the opposing side surfaces; and
the exciting means causes the third vibration element to vibrate at the excitation frequency thereof, the third vibration element causes the elastic body to vibrate in the second direction, and the magnitude of the vibration of the elastic body in the first and second directions is determined by phase differences between magnitudes of the vibration of the first, second, and third vibration elements.

5. The electromechanical transducer of claim 2, wherein the vibration elements are piezoelectric elements.

6. The electromechanical transducer of claim 4, wherein the phase differences between magnitudes of the vibration of the first, second, and third vibration elements are set to minimize the vibration of the elastic body in the second direction.

7. The electromechanical transducer of claim 6, wherein a mover of an ultrasonic motor abuts the elastic body such that the elastic body moves the mover in the first direction.

8. The electromechanical transducer of claim 7, wherein the vibration elements are piezoelectric elements.

9. An electromechanical transducer comprising:
an elastic body having a first resonance frequency in a first direction and a second resonance frequency in a second direction orthogonal to the first direction, said first resonance frequency and said second resonance frequency being substantially equal to a common excitation frequency, said elastic body having nodal points at which said elastic body does not move when said elastic body vibrates at a said resonance frequency thereof;
first and second piezoelectric vibration elements symmetrically attached to said elastic body about said nodal point;
support means for supporting said elastic body at said nodal point, said elastic body having at least two nodal points in said first direction and at least three nodal points in said second direction wherein said support means is attached to said elastic body at a central one of said nodal points in said second direction;
a third piezoelectric vibration element attached to said elastic body, said first and second vibration elements being attached to opposing side surfaces of said elastic body and said third vibration element being attached to a surface of said elastic body orthogonal to said opposing side surfaces; and
excitation means for causing said first, second, and third piezoelectric vibration elements to vibrate at said excitation frequency, wherein a magnitude of said vibration of said elastic body in said first and second directions is determined by phase differences between magnitudes of said vibration of said first, second, and third vibration elements.

10. An electromechanical transducer comprising:
an elastic body having a first resonance frequency in a first direction and a second resonance frequency in a second direction orthogonal to the first direction, said first resonance frequency and said second resonance frequency being substantially equal to a common excitation frequency, said elastic body having at least one nodal point at which said elastic body does not move when said elastic body vibrates at a said resonance frequency thereof;
first and second piezoelectric vibration elements symmetrically attached to said elastic body about said nodal point;
support means for supporting said elastic body at said nodal point, said elastic body having at least two nodal points in said first direction and at least three nodal points in said second direction and said support means being attached to said elastic body at a central one of said nodal points in said second direction;
excitation means for causing said first and second piezoelectric vibration elements to vibrate at said excitation frequency, wherein a magnitude of said vibration of said elastic body in said first and second direction is determined by a phase difference between said vibration of said first and second vibration elements; and
a third vibration element attached to said elastic body, said first and second vibration elements being attached to opposing side surfaces of said elastic body and said third vibration element being attached to a surface of said elastic body orthogonal to said opposing side surfaces, wherein said excitation means causes said third vibration element to vibrate at said excitation frequency thereof, said third vibration element causes said elastic body to vibrate in said second direction, and a magnitude of said vibration of said elastic body in said first and second directions is determined by phase differences between magnitudes of said vibration of said first, second, and third vibration elements.

* * * * *